(12) United States Patent
McIntosh et al.

(10) Patent No.: US 6,352,239 B1
(45) Date of Patent: Mar. 5, 2002

(54) GATE VALVE ACTUATOR OVERRIDE MECHANISM

(75) Inventors: Gavin John Liam McIntosh, Midlothian; Graeme John Collie, Fife, both of (GB)

(73) Assignee: FMC Corporation, Chicago, IL (US)

( * ) Notice: Subject to any disclaimer, the term of this patent is extended or adjusted under 35 U.S.C. 154(b) by 0 days.

(21) Appl. No.: 09/531,793

(22) Filed: Mar. 21, 2000

(30) Foreign Application Priority Data

Mar. 25, 1999 (GB) ............................................. 9906952

(51) Int. Cl.[7] ........................................... F16K 31/143
(52) U.S. Cl. ............................ 251/100; 251/14; 251/64
(58) Field of Search .............................. 251/14, 64, 95, 251/100, 337; 92/15, 23

(56) References Cited

U.S. PATENT DOCUMENTS

| | | | | |
|---|---|---|---|---|
| 2,662,511 A | * | 12/1953 | Sward | ..................... 251/337 X |
| 3,747,579 A | * | 7/1973 | Altmann | ................. 251/337 X |
| 4,194,718 A | | 3/1980 | Baker et al. | ................... 251/14 |
| 4,436,279 A | * | 3/1984 | Bonds et al. | ............. 251/14 X |
| 4,617,992 A | | 10/1986 | Abel | ........................... 166/95 |
| 4,815,692 A | | 3/1989 | Loiseau et al. | ............... 251/14 |
| 4,827,963 A | * | 5/1989 | Baker et al. | ............. 251/14 X |
| 4,844,407 A | * | 7/1989 | Baker | .......................... 251/14 |
| 4,921,207 A | * | 5/1990 | Baker | .......................... 251/14 |
| 4,946,130 A | * | 8/1990 | Kooiman | ................ 251/100 X |
| 5,046,376 A | * | 9/1991 | Baker | ...................... 251/14 X |

\* cited by examiner

*Primary Examiner*—Kevin Shaver
*Assistant Examiner*—Eric Keasel
(74) *Attorney, Agent, or Firm*—Pauley Petersen Kinne & Fejer

(57) ABSTRACT

A gate valve hydraulic actuator having a stem extension accessible from outside the actuator body to provide override operation of the gate valve, for example in the event of hydraulic failure. The stem extension is lockable to a spring compression hub in a valve open position and a valve closed position by locking dogs selectively engageable in recesses. The locking dogs are operated by a cam spindle coaxially received in the stem extension.

14 Claims, 2 Drawing Sheets

Fig.2.
Fig.4.
Fig.3.
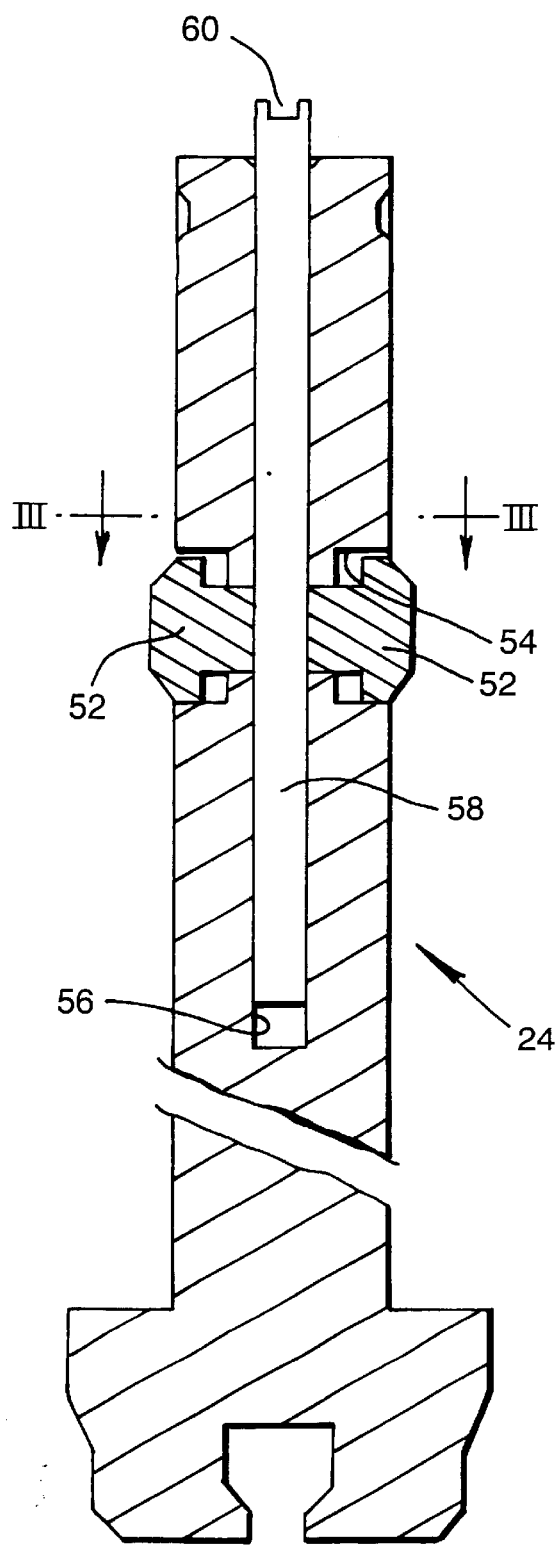
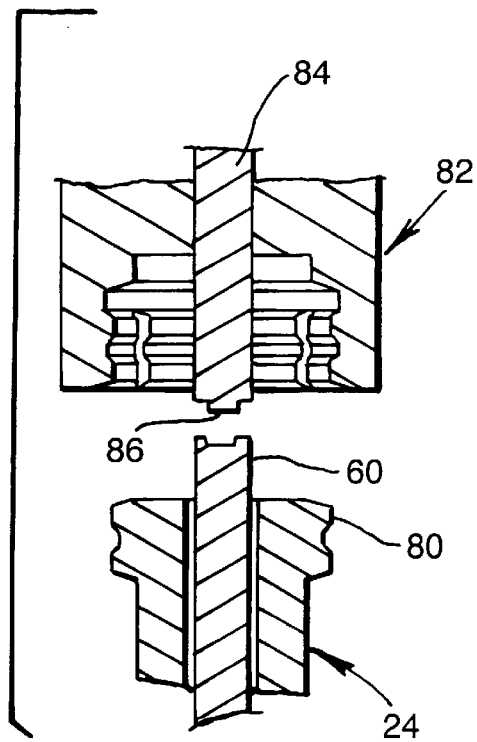
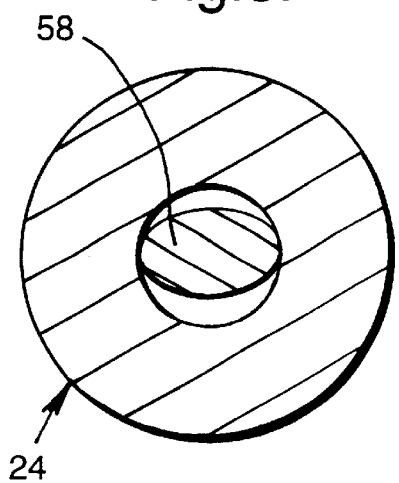

GATE VALVE ACTUATOR OVERRIDE MECHANISM

FIELD OF THE INVENTION

This invention relates to hydraulic actuators for gate valves such as may be found in subsea Christmas trees used in petroleum production.

BACKGROUND OF THE INVENTION

Typically, such actuators are hydraulically opened and include an integral, spring-operated fail-safe closure mechanism. In addition, the facility to manually operate the actuator in the event of a hydraulic failure is incorporated. This manual override is usually performed by an ROV that rotates an upper stem section of the actuator. The upper stem section is either threadingly mounted to the actuator body, or to a lower stem section coupled to the valve gate, so that rotation of the upper stem section is converted into linear motion of the lower stem section to open the valve.

At high production fluid pressures in the valve bore and cavity, the torque required to rotate the upper stem (and hence manually actuate the valve) is increased and can become excessive. There is also an inherent risk of galling and possible seizure of the mating threaded components.

SUMMARY OF THE INVENTION

The present invention provides a gate valve hydraulic actuator comprising:
  a body;
  a valve stem received in the body for linear sliding movement;
  a piston connected for hydraulic actuation of the stem;
  a stem extension accessible from outside the actuator body in use for imposition of linear movement thereto; and
  locking dogs carried by or engageable with the stem or stem extension, operable selectively to lock the valve stem relative to the actuator body, to resist the linear sliding movement.

Preferably, the locking means are operable to lock the valve stem for such movement resistance in valve open and valve closed positions.

The locking dogs may be cam operated. Advantageously, the locking dogs are actuated by a cam spindle received in an axial bore formed in the stem extension.

The locking dogs may serve to lock the stem or stem extension to a collar surrounding the stem or stem extension and biassed towards the valve closed position by a spring positioned between the collar and the actuator body. This spring provides the valve fail-safe closure bias and, when the locking dogs are operative, also serves to resist the linear movement of the valve stem and/or stem extension, towards the valve open position.

Preferably the stem extension comprises an ROV linear tooling connector, such as a "Torus" type connector known in the industry.

Further preferred features and advantages of the invention are in the following description of an illustrative embodiment, made with reference to the drawings.

BRIEF DESCRIPTION OF THE DRAWINGS

FIG. 2 is a cross-section through a stem extension component of the actuator shown in FIG. 1;

FIG. 3 is a cross-section on line III—III in FIG. 2; and

FIG. 4 shows an ROV tool and stem extension end profile for use with the present invention.

DESCRIPTION OF THE PREFERRED EMBODIMENTS

Figure 1:
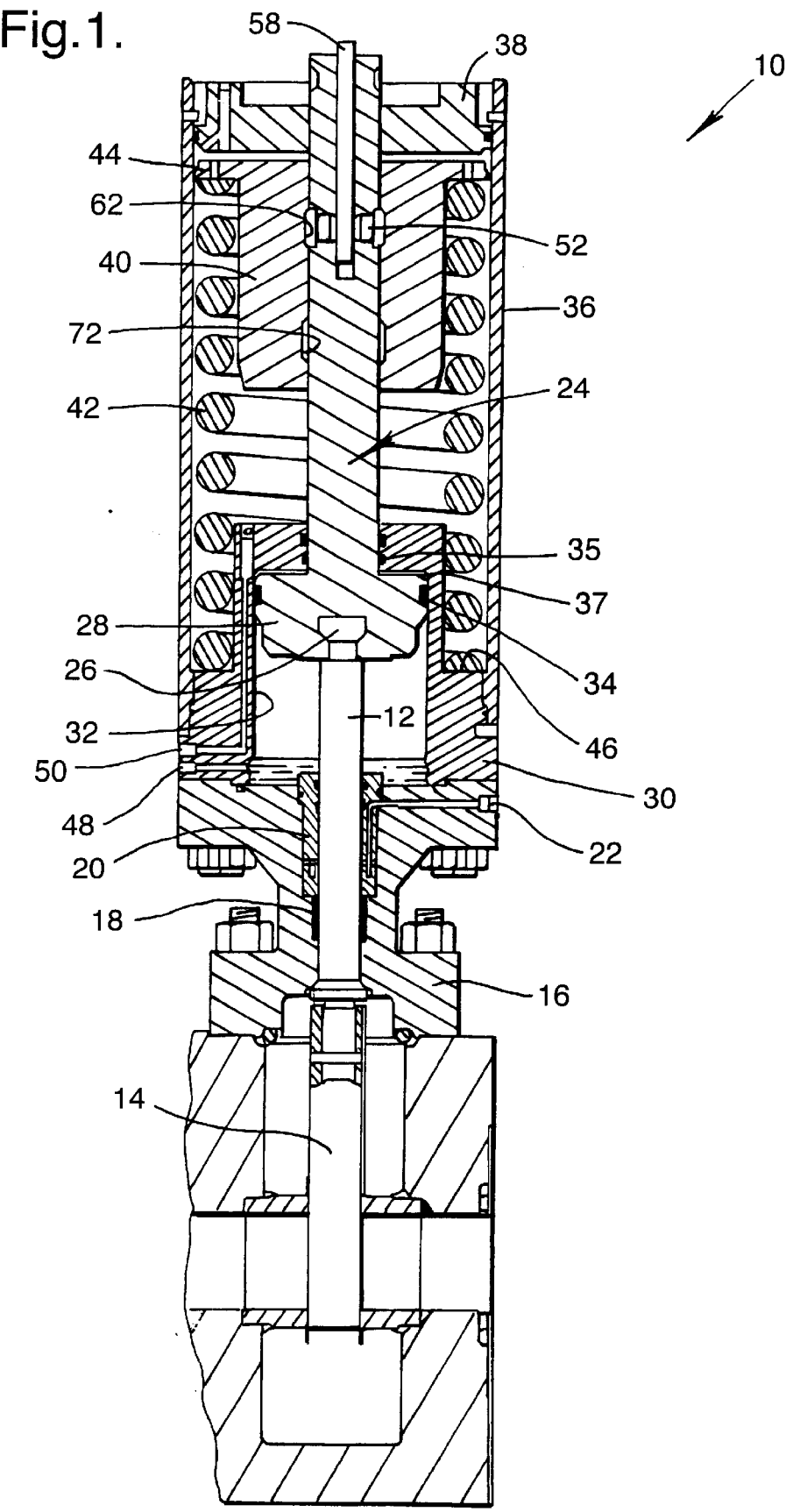
FIG. 1 is a cross-section through a valve actuator embodying the invention, attached to a gate valve.

The actuator 10 shown in FIG. 1 comprises a valve stem 12 connected to a valve gate 14. The valve stem 12 is axially slideable in a valve bonnet 16, to move the gate 14 between open and closed positions. The bonnet 16 contains a valve stem packing 18, gland nut 20 and test/sealant injection port 22, as is conventional.

A valve stem extension 24 is connected to a boss 26 formed on the end of the stem 12 opposite to the gate 14. The stem 12 and stem extension 24 are thus linked together for linear movement as a unit. The end of stem extension 24 surrounding the boss 26 takes the form of a piston 28. A cylinder 30 is bolted to the bonnet 16 to define a chamber 32 in which the piston 28 slides. A circumferential sliding seal 34 is provided between the piston 28 and the adjacent wall of the chamber 32. The stem extension passes through an aperture in the cylinder 30 and a further seal 35 is provided between the stem extension and aperture to define a chamber 37 behind the piston 28. A tubular housing 36 is mounted at one end to the cylinder 30, to surround the stem extension 24. The other end of the housing 36 is closed by an end cap 38, through which a portion of the stem extension protrudes, for engagement by an ROV tool, as further described below. The bonnet 16, cylinder 30, housing 36 and end cap 38 together thus form a body of the actuator, in which the remaining actuator components are accommodated.

A spring compression hub 40 is formed as a collar surrounding the stem extension 24, adjacent to the end cap 38 and slidable in the housing 36. A compression spring 42 is fitted between a flange 44 on the end of the compression hub 40 and a shoulder 46 formed on the cylinder 30, to bias the compression hub 40 towards the end cap 38.

In normal use, the actuator 10 is hydraulically actuated as follows. The stem extension 24 is locked to the spring compression hub by means further described below. The spring 42 thus biases the stem extension 24, stem 12 and valve gate 14 towards the valve closed position (upwardly as shown in FIG. 1), providing fail safe closure of the valve. If desired, hydraulic fluid may be supplied to the chamber 32 via a port 48 to assist in closing the valve. To move the stem extension 24, stem 12 and valve gate 14 towards and into the valve open position, hydraulic fluid is supplied to the chamber 37 via a port 50.

In order to override hydraulic operation of the actuator 10, the stem extension 24 is selectively lockable and unlockable to the spring compression hub 40 by locking dogs 52 (see FIG. 2).

The locking dogs 52 are located within a recess 54 machined into the actuator stem extension 24. The stem extension 24 has a longitudinal bore 56, in which a cam spindle 58 is received. Lower faces of the locking dogs 52 rest against an elliptical cam profile of the spindle 58. Elsewhere along its length the spindle 58 may be circular in section, to center it for rotation within the bore 56, and to accommodate a rotational drive formation 60 at an exposed end of the spindle 58.

During normal hydraulic operation of the actuator 10, the locking dogs 52 are fully engaged in outer mating recesses 62 (FIG. 1) in the spring compression hub 40, with the cam spindle 58 locked against rotation e.g. by suitable detent means (not shown). The stem extension 24 is therefore locked to the spring compression hub 40 to provide hydraulic actuation of the gate 14 and fail safe closure bias of the gate 14 by the spring 42 as described above.

In order to operate the hydraulic actuator override mechanism, the cam spindle 58 is rotated gradually through 90° using the drive formation 60, thus disengaging the locking dogs 52 from the outer recesses 62. The stem extension 24 can now be displaced axially, independently of the spring compression hub 40.

The externally exposed portion of the stem extension 24 and the cam spindle drive formation 60 are profiled to be engageable by standard ROV tooling packages. These profiles permit the ROV to latch onto the stem extension 24 and to then override the actuator hydraulic operation by direct axial movement of the stem extension.

To open the valve, the ROV rotates the cam spindle 58 through 90° as described above and pushes the stem extension inwardly. To close the valve, it is necessary for the ROV to pull the stem extension outwardly, as the closure bias spring is disconnected by disengagement of the locking dogs 52 from the compression hub 40. For stabilization and transmission of reaction forces, the ROV will fasten itself in known manner to strong points on an ROV panel, surrounding the actuator end cap 38, or to suitable anchor points on the Christmas tree structure.

Once the stem extension 24 has been pushed fully inwards to the valve open position using the ROV, the ROV can rotate cam spindle 58 through 90° again, to engage the locking dogs 52 with inner recesses 72 formed in the spring compression hub 40. The gate 14 is therefore held fully open by the override mechanism, until the ROV operates the cam spindle 58 and pulls out the stem extension 24 to close the valve once more. The locking dogs have a tapered corner profile to ensure that they fully disengage from the recesses 62, 72 when the cam spindle 58 is so rotated and the stem extension 24 translated.

FIG. 4 shows a typical profile 80 for the exposed end of the stem extension 24, for engagement with a standard "Torus" type tooling profile 82 of an ROV. The ROV tooling also includes a rotatable shaft 84 having an end profile 86 complementary to the cam spindle drive formation 60.

Although the locking dogs 52 and recesses 62, 72 are shown in the above embodiments as operating between the stem extension 24 and spring compression hub 40, other arrangements are possible. For example, the spring compression hub can be fixedly assembled with the stem extension 24 which may thus be pushed inwardly by the ROV against the bias of spring 42 to open the valve. Suitable locking dogs may then be operated to retain the stem extension in the inward position. This arrangement has the disadvantage, compared to the previously described embodiment, that greater force is required to open the valve, in that the bias force of spring 42 must be overcome. However, this arrangement has the advantage that the fail-safe closing action of the valve is maintained. Rather than locking dogs within the stem extension 24 which engage with adjacent recesses such as 62, 72, the actuator may comprise a locking dogs attached to or forming part of the actuator body, engageable in one or more corresponding recesses in the stem 12 or stem extension 24. The stem 12, stem extension 24 and/or piston 28 may be formed as a unitary component. The piston 28 may be carried by the stem 12 rather than the stem extension 24.

Various other modifications will be readily apparent, within the scope of the claims.

What is claimed is:

1. A gate valve actuator comprising:
   an actuator body including a spring;
   a valve stem received in the actuator body for linear sliding movement;
   a piston connected to the valve stem for hydraulic actuation of the valve stem;
   a spring compression hub, the spring compression hub biased towards a valve closed position by the spring;
   a stem extension accessible from outside the actuator body for imposition of linear sliding movement thereto, the stem extension forming an axial bore;
   a cam spindle received in the axial bore; and
   locking dogs carried by or engageable with the stem extension, the locking dogs operable to lock the stem extension to the spring compression hub, wherein the locking dogs are actuated by the cam spindle.

2. An actuator as defined in claim 1, wherein the valve stem is positioned in one of a valve open position and the valve closed position.

3. An actuator as defined in claim 1, wherein the stem extension comprises a ROV linear tooling connector.

4. An actuator as defined in claim 1, wherein the locking dogs are positioned within a recess of the stem extension.

5. A gate valve hydraulic actuator, comprising:
   an actuator body;
   a valve stem positioned within the actuator body;
   a valve stem extension connected to the valve stem, at least a portion of the valve stem extension positioned within the actuator body, the valve stem and the valve stem extension axially displaceable with respect to the actuator body;
   a spring compression hub surrounding at least a portion of the valve stem extension; and
   at least one locking dog connected with respect to the valve stem extension, the at least one locking dog engageable with one of an outer recess of the spring compression hub and an inner recess of the spring compression hub,
   wherein the valve stem extension forms a longitudinal bore in which a cam spindle is received, the cam spindle is rotatable between a first position wherein the at least one locking dog is engaged with one of the outer recess and the inner recess and a second position wherein the at least one locking dog is disengaged from one of the outer recess and the inner recess.

6. An actuator as defined in claim 5, wherein at least a portion of the valve stem extension protrudes from within the actuator body.

7. An actuator as defined in claim 5, wherein the at least one locking dog is positioned within a recess of the valve stem extension.

8. An actuator as defined in claim 5, wherein at least a portion of the cam spindle has a generally elliptical cross-section.

9. An actuator as defined in claim 5, wherein when the at least one locking dog is engaged with the outer recess, a valve gate connected to the valve stem is in a valve closed position.

10. An actuator as defined in claim 5, wherein when the at least one locking dog is engaged with the inner recess, a valve gate connected to the valve stem is in a valve open position.

11. An actuator as defined in claim 5, wherein an end portion of the valve stem forms a boss and an end portion of the valve stem extension forms a piston connected to at least a portion of the boss.

12. An actuator as defined in claim 5, wherein the at least one locking dog has a tapered corner profile.

13. An actuator as defined in claim 5, further comprising a compression spring positioned with respect to the spring compression hub to bias a valve gate towards a valve closed position.

14. A gate valve hydraulic actuator, comprising:

an actuator body;

a valve stem positioned within the actuator body;

a valve stem extension connected to the valve stem, at least a portion of the valve stem extension positioned within the actuator body, the valve stem and the valve stem extension axially displaceable with respect to the actuator body;

a spring compression hub surrounding at least a portion of the valve stem extension;

at least one locking dog connected with respect to the valve stem extension, the at least one locking dog engageable with one of an outer recess of the spring compression hub and an inner recess of the spring compression hub; and a drive formation connected to a cam spindle, the drive formation rotatable to one of engage and disengage the at least one locking dog with respect to one of the outer recess and the inner recess.

\* \* \* \* \*